United States Patent Office 3,107,324
Patented Oct. 15, 1963

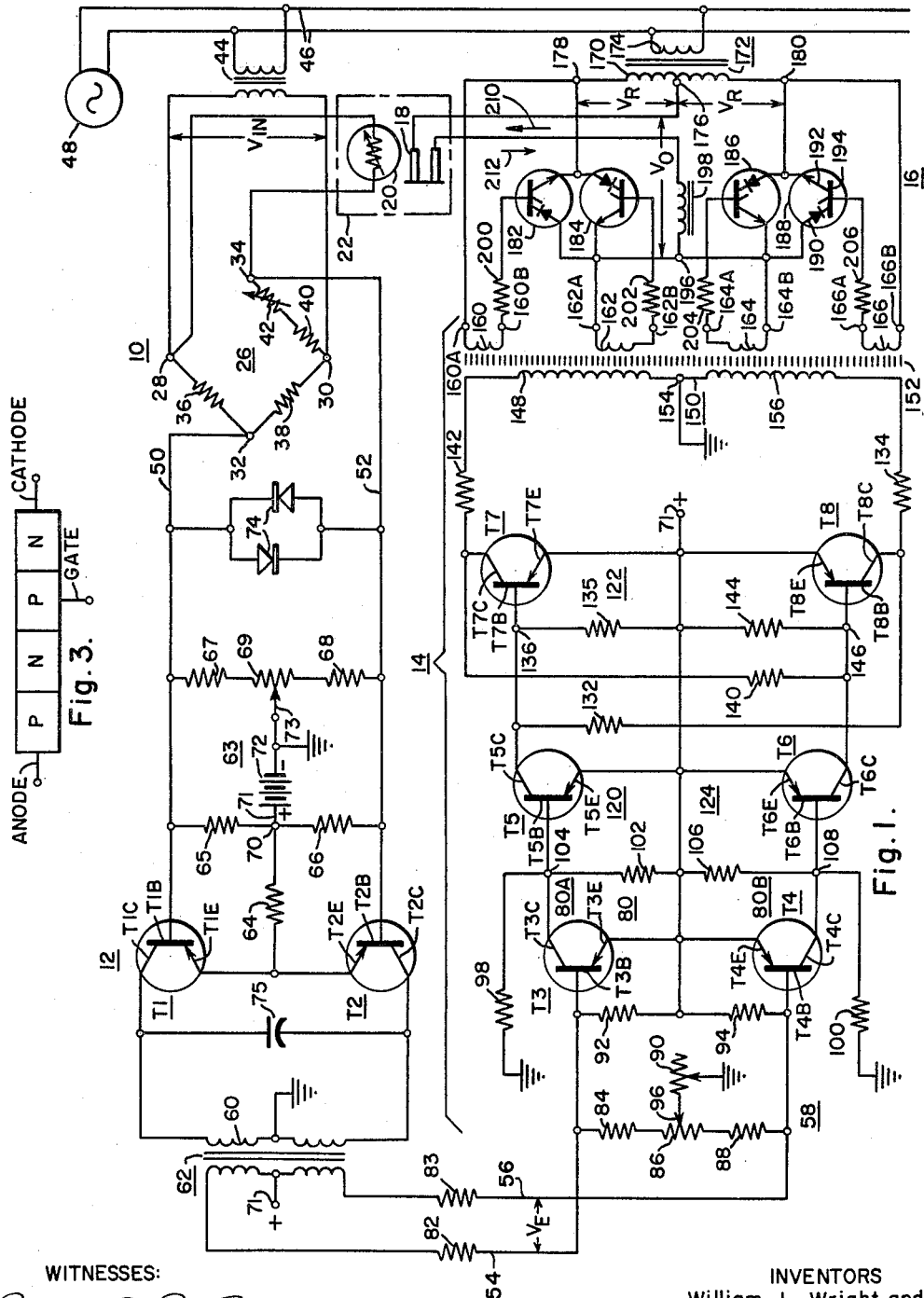

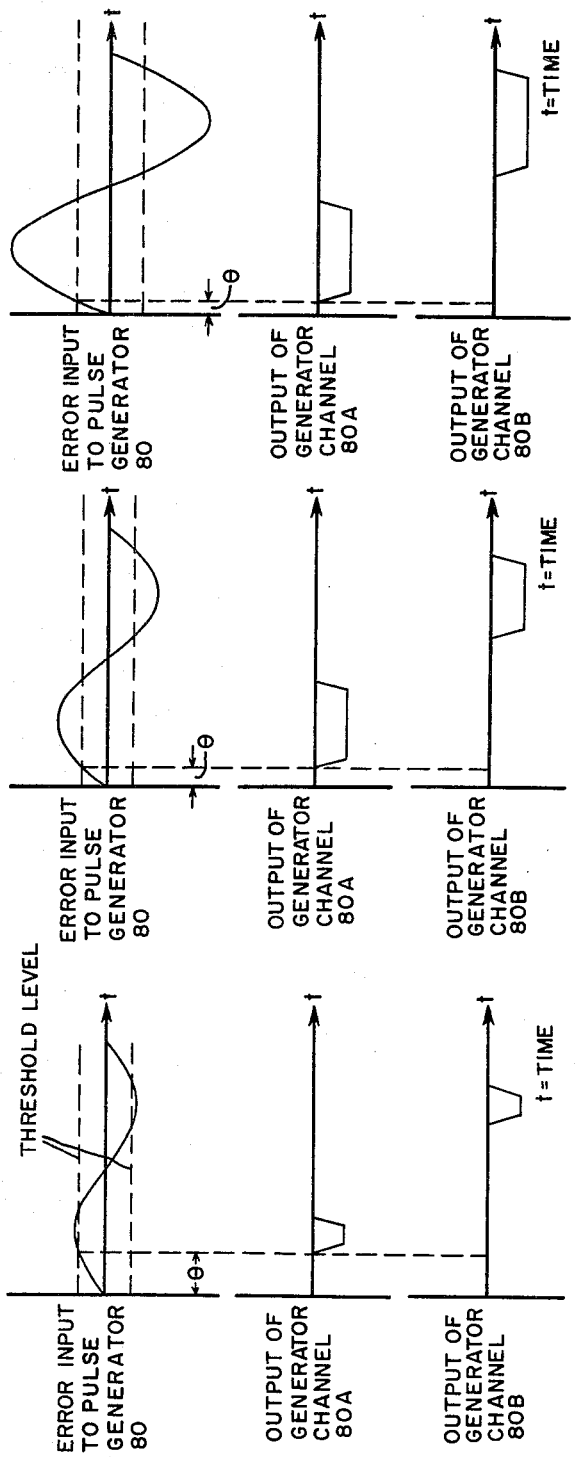

3,107,324
SYSTEM FOR CONTROLLING THE QUANTITY AND DIRECTION OF CURRENT SUPPLIED TO A LOAD
William L. Wright, Monroeville, Pa., and Russell A. Stuart, St. Petersburg, Fla., assignors to Westinghouse Electric Corporation, East Pittsburgh, Pa., a corporation of Pennsylvania
Filed July 28, 1961, Ser. No. 127,732
9 Claims. (Cl. 321—16)

This invention relates to regulating apparatus and more particularly to apparatus for regulating the temperature of a zone serviced by a thermoelectric heat pump (Peltier coupler) by controlling the quantity and direction of current supplied to the thermoelectric device in response to temperature changes of the controlled zone.

Heretofore, control of thermoelectric heat pump systems has been substantially limited to either on-off type of control or modifications thereof, or to proportional controls in systems using D.-C. error signals. The present invention contemplates the use of periodic wave error signals in a unique proportional control system that provides to the thermoelectric device reversible output D.-C. in quantity and polarity as commanded by the error signal to maintain or regulate the temperature of a zone serviced by the thermoelectric device. The present invention provides a more precise control system. Since the system is especially well adapted to the use of solid state devices, additional advantages accrue such as high reliability, long life, and resistance to physical conditions, for example, vibration and shock. Additionally, if a low level A.-C. error signal is used, it can be amplified with little problem due to bias shifts with temperature.

In acordance with one embodiment of the invention, there is provided a system using a temperature responsive A.-C. error signal of reference frequency that feeds a push-pull system wherein output pulses are produced which have a leading edge whose phase position is dependent on the amplitude of the error signal, these output pulses in turn being employed to produce control pulses of alternating polarity whose phase positions with respect to the A.-C. error signal depend on the phase positions of the leading edges of the output pulses and whose instantaneous polarity depend on the instantaneous polarity of the error signal. These control pulses are used to control the conduction times and direction of a reversible output D.-C. rectifier supplied by A.-C. of the same reference frequency and providing a D.-C. output to a load device which causes an increase or decrease in temperature as dictated by the error signal.

It is, therefore, an object of the present invention to provide a novel periodic input wave controlled proportional system for supplying to an output circuit D.-C. with amplitude dictated by the command signal.

Another object of the present invention is to provide a novel A.-C. error signal controlled proportional system for supplying to an output circuit D.-C. having amplitude and polarity as dictated by the command signal.

Another object of the invention is to provide a novel circuit which in response to periodic input waves produces output waves each with a leading edge whose phase position relative to the input waves is dependent upon the amplitude of the input waves.

Another object of the invention is a system which in response to periodic input waves produces output waves having leading edges whose phase positions are dependent upon the amplitude of the input waves and which system includes a circuit responsive to the leading edges of the output waves for producing pulses whose phase position is dependent on the phase position of the leading edges of the output waves.

Another object of the invention is to provide a system which in response to an input A.-C. of a reference frequency produces output waves having leading edges whose phase position is dependent on the amplitude of the input waves and wherein there is a circuit which in response to the output waves produces pulses whose phase position relative to the input waves is dependent on the phase position of the leading edges of the output waves and whose polarity is dependent on the polarity of the input waves.

A further object is a flip-flop controlled reversible output rectifier.

Other objects and advantages of the present invention will become apparent from the following description taken in connection with the accompanying drawings wherein there is illustrated a preferred form of the invention as embodied in a thermoelectric regulating system.

FIGURE 1 is a circuit diagram of a temperature regulating system;

FIGS. 2A, 2B and 2C illustrate input and output waveforms of a pulse generator in the system of FIG. 1;

FIG. 3 illustrates the structure of controlled switch elements employed in a current converter stage of the system of FIG. 1;

Figure 4:
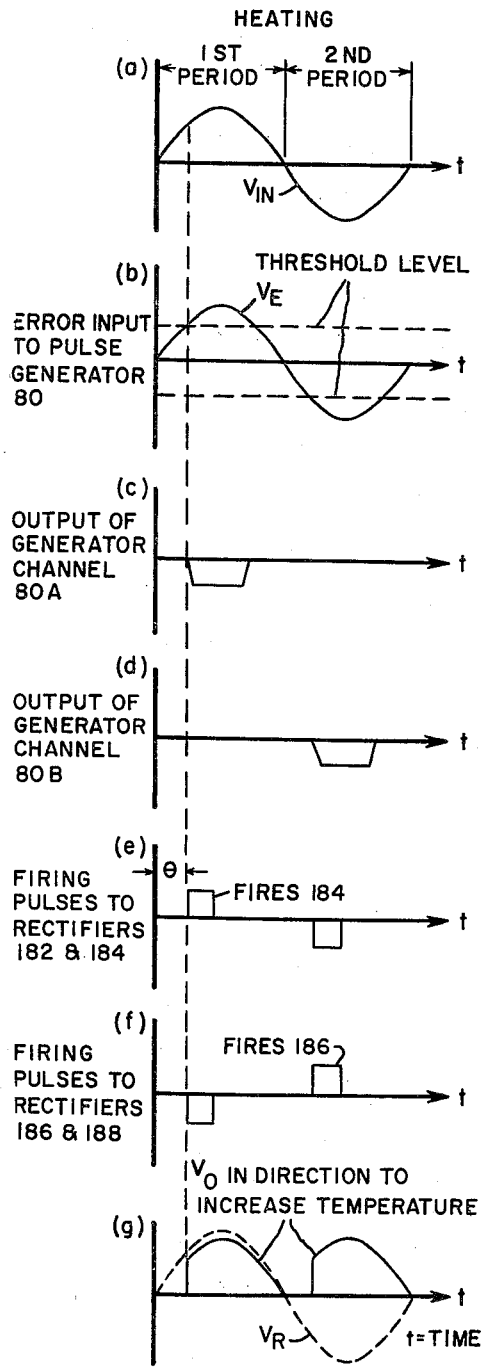
Figure 5:
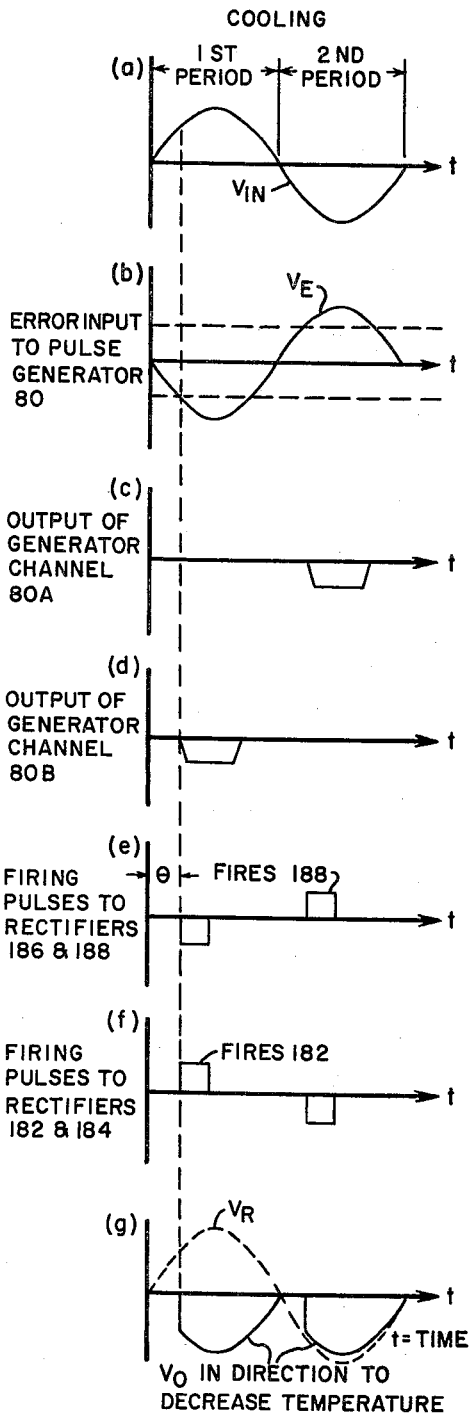

FIGS. 4 and 5 shown waveforms occurring at various points of the system in FIG. 1 when the system is responding to temperature deviations.

The system shown in FIG. 1 includes a condition responsive circuit 10 for producing a periodic command wave having a reference frequency and a front, with a finite slope. The output of a command generator 10 is coupled through an amplifier 12 to a circuit 14 which produces output pulses whose polarity is dependent on and reverses with the polarity of the command signal, and whose phase position relative to the command signal varies with the amplitude of the command signal. These output pulses are used to control the conduction time and direction of a rectifier system 16 which converts A.-C. of the same frequency as the command signal to D.-C., which is supplied to a load 18 that affects the condition being sensed by the command generator 10.

In the specific example described, the condition responsive circuit 10 is a temperature responsive circuit employing a temperature responsive impedance 20, for example a thermistor, as a sensing device located in a confined zone 22, whose temperature is to be regulated to a desired level, which level for convenience may be referred to as "normal temperature." Within the zone 22 there is also shown a temperature producing device 18 for example a reversible thermoelectric heat pump comprising a plurality of Peltier couples, which transfer heat in one or the opposite direction, depending on the direction of current flow through the Peltier couples.

The circuit 10 includes an impedance bridge 26 having input terminals 28 and 30, and output terminals 32 and 34. One arm of the bridge is formed by impedance 20, another arm includes an impedance 36; another arm, an impedance 38; and another arm, impedances 40 and 42. By way of example, all the impedances in the bridge 26 are shown as resistors although other suitable impedances may be used.

The bridge 26 is energized with A.-C. voltage $V_{IN}$ from a transformer 44 connected to an A.-C. line 46, which in turn is connected to a suitable A.-C. source 48. The bridge 26 is balanced to produce no output at terminals 32 and 34 when the temperature in the zone 22 is normal, i.e., at the desired level. However, when the temperature in zone 22 deviates from normal, the changing resistance of thermistor 20 unbalances the bridge in one or the other direction depending on the direction of temperature change, thereby to produce at the bridge output terminals 32 and 34, an error signal in the form of an A.-C. wave that is either in phase with or 180° out of phase with the bridge input A.-C. depending on the direction of temperature deviation. The amplitude of the bridge output is an indication of and varies with the amount of temperature deviation in a particular direction.

Since the input to the bridge 26 is sinusoidal, the bridge provides output waves having a front with a finite slope.

The error signal produced by the bridge is fed through lines 50 and 52 to amplifier 12, where it is amplified and then applied along lines 54 and 56 as $V_E$ to the input circuit 58 of the circuit 14.

Amplifier 12 includes transistors T1 and T2 operating in push-pull into the center-tapped primary winding 60 of an output transformer 62 whose center-tapped secondary winding is connected to the input circuit 58 of circuit 14.

Transistor T1 is provided with a base T1B, an emitter T1E, and a collector T1C. Likewise, transistor T2 has an emitter T2E, a base T2B, and a collector T2C. Lines 50 and 52 are connected to the bases T1B and T2B, respectively. A biasing network 63 for the amplifier includes resistors 64, 65, 66, 67, 68 and a balancing resistor 69. Resistor 64 is connected from the commonly connected emitters T1E and T2E to a point 70 connected to a positive bus 71 tied to the positive end of a battery 72. Resistors 65 and 66 are respectively connected to lines 50 and 52 and to the point 70. Resistors 67, 69 and 68 are connected in series across lines 50 and 52. An adjustable tap 73 on resistor 69 is connected to ground, to which the negative end of battery 72 is connected. The two channels of amplifier 12 may be balanced by adjusting the tap 73. The collectors of transistors T1 and T2 are connected to opposite ends of the primary 60 of the transformer 62. The center tap of winding 60 is connected to ground.

Oppositely poled diodes 74 connected across lines 50 and 52 have threshold conduction values which are below the safety or safe input values of transistors T1 and T2, thus protecting these transistors from being overdriven by the output signals from the bridge 26. A capacitor 75 connected between the collectors of transistors T1 and T2 suppresses parasitic oscillations thereby preventing false output signals.

The first stage of circuit 14 is a push-pull input pulse generator 80 with two channels 80A and 80B. The generator 80 produces an output pulse at the output of whichever channel receives an input signal wave of a particular polarity, which pulse has a leading edge that lags the leading edge of the input wave by an angle depending upon and varying with the amplitude of the input wave. More specifically, the generator 80 includes a transistor T3 and a transistor T4 whose respective bases T3B and T4B are connected in push-pull to the input circuit 58 to receive the error signals $V_E$ from the transformer 62 on lines 54 and 56 in push-pull, so that a given error signal tends to simultaneously drive one transistor of generator 80 up and the other transistor down. Current limiting resistors 82 and 83 in lines 54 and 56 prevent overload of the amplifier 12, and thereby avoid faulty error signals.

A bias network in the input circuit 58 includes resistors 84, 86, 88, 90, 92 and 94. Resistors 84, 86 and 88 are connected in series across lines 54 and 56. The center tap of the secondary winding of output transformer 62 is connected through the battery 72 and adjustable resistor 90 to a variable tap 96 on resistor 86. The variable tap 96 is adjusted to balance the response of generator channels 80A and 80B to input error signals of equal amplitude. One end of resistor 92 is connected between the base T3B and the positive bus 71. Resistor 94 is connected between the base T4B and the positive bus 71. The emitters T3E and T4E of transistors T3 and T4 are connected to the positive bus. The respective collectors T3C and T4C of transistors T3 and T4 are connected through resistors 98 and 100 to ground. The output of generator channel 80A is taken across an output resistor 102 connected to the emitter T3E and to an output terminal 104 tied to the collector T3C. The output of generator channel 80B is taken across an output resistor 106 connected between the emitter T4E and an output terminal 108 tied to the collector T4C of transistor T4. Resistors 102 and 106 are also part of the biasing circuits for following transistors T5 and T6 respectively.

Transistors T3 and T4 are shown as p-n-p type and their bias circuits are arranged to normally bias these transistors to saturation (full on) at quiescent or zero command signal from amplifier 12. Being biased full on there will be no output across the respective output resistors 102 and 106 at quiescent. Each of transistors T3 and T4 is so biased that it is driven down (toward cut-off) to produce an output across its output resistor only when a positive input signal applied to the transistor exceeds a predetermined threshold level.

Because of the threshold response, the generator 80 produces output pulses, each having leading and lagging edges that coincide with the points at which the front and back of the input wave that produces the pulse crosses the threshold value. This is illustrated in FIGS. 2A, 2B and 2C, wherein three different amplitudes of input voltages are shown together with the output pulses produced in response to each. From these figures taken in connection with the following restated circuit relations, it is apparent that the generator 80 produces output pulses whose leading edge lags the leading edge of the input wave by an angle that depends on and varies with the amplitude of the input wave. Because of the push-pull arrangement an error signal of a particular polarity will be applied as a positive signal to one channel of generator 80 and as a negative signal to the other channel. For example, if the error signal is of such polarity that it is seen as a positive signal by transistor T3, it will be simultaneously seen as a negative signal by transistor T4. Since the transistors T3 and T4 are biased to saturation and are p-n-p type, a positive signal above the threshold value applied to one of these transistors will cut it off and provide a negative output pulse across its output resistor. An alternating input signal whose amplitude rises above the input threshold value of the generator 80 will cause the generator to provide negative pulses alternately at the outputs of channels 80A and 80B. One half cycle of the input error signal drives one channel, and the opposite half cycle of the input signal drives the other channel. Thus, the generator 80 is responsive to only the portions of the error signal above the threshold value to produce output pulses at one or the other of channels 80A and 80B, depending on the instantaneous polarity of the error signal.

The threshold response of generator 80 results in a base clipping action on the input waves applied to the generator. The threshold level of generator 80 may be changed by adjusting resistor 90. As transistor T3 approaches cut-off, the amplitude of the output pulses of channel 80A is limited to the value set by the voltage divider formed by resistors 98 and 102. A similar voltage divider for channel 80B is formed by resistors 100 and 106. Due to this amplitude limitation, the output pulses appear truncated as seen in FIG. 2A, B and C.

Negative output pulses of generator channel 80A, after amplification by an amplifier 120 are employed to trigger one state of a flip-flop 122, while the negative output pulses of generator channel 80B are amplified by an amplifier 124, and the amplifier pulses are used to trigger the flip-flop 122 to its other state. Amplifier 120 includes transistor T5, having a base T5B connected to the output terminal 104 of generator channel 80A. The collector T5C of transistor T5 is connected to ground and the negative end of battery 72 through a circuit including resistors 132 and a resistor 134. The emitter T5E of transistor T5 is connected to the positive bus 71. The output of amplifier 120 is taken across a resistor 135 connected between the positive bus 71 and an output terminal 136 tied to the collector T5C. Resistor 135 is across the collector-emitter circuit of transistor T5C. In like manner, amplifier 124 includes: a transistor T6 having a base T6B connected to the output terminal 108 of generator channel 80B; an emitter T6E connected to the positive bus lines; and a collector T6C connected to ground and the negative terminal of the battery 72 through a circuit including resistors 140 and 142. The output of amplifier 124 is taken across a resistor 144 connected to the positive bus 71 and to an output terminal 146 tied to the collector T6C. Resistor 144 is across the collector-emitter circuit of transistor T6C. Being of common emitter configuration, the output signals of amplifiers 120 and 124 are inverted with respect to their input signals. Thus negative pulses from the generator 80 are amplified and inverted by the amplifiers 120 and 124, and applied as positive pulses to the flip-flop 122. The gain of the generator 80 and of amplifiers 120 and 124 provides output pulses with leading edges having the requisite slope and amplitude to trigger the following flip-flop stage.

Flip-flop 122 is a conventional bistable multivibrator with two switching elements for example the transistors shown at T7 and T8 having their outputs and inputs cross coupled in the conventional direct coupled manner to provide the regenerated feedback for the switching function between stable states. Transistor T7 includes an emitter T7E, a base T7B, and a collector T7C. Likewise, transistor T8 includes a base T8B, an emitter T8E, and a collector T8C. The base T7B is connected to the output terminal 136 of amplifier 120, and through resistor 135 to the positive bus 71. Emitter T7E is also connected to the positive bus. Collector T7C is connected through resistor 142 to an end terminal of a half section 148 of a center-tapped primary winding 150 of a saturating peaking transformer 152. The center tap 154 of winding 150 is connected to ground (negative bus), while the other half 156 of the primary winding is connected through resistor 134 to collector T8C of transistor T8. The base T8B is connected to the output terminal 146 of amplifier 124, and through a resistor 144 to the positive bus 71. Emitter T8E is also connected to the positive bus. Resistor 140 is in the feedback link from the output of transistor T7 to the input of transistor T8. In the same manner, resistor 132 is in the feedback line from the output of transistor T8 to the input of transistor T7. For convenience, the two stable states of the flip-flop may be arbitrarily designated states A and B, the flip-flop being in the state A when transistor T7 is off and transistor T8 is on, and in state B when transistor T8 is off and transistor T7 is on. Transformer 152 also includes a plurality of secondary windings 160, 162, 164 and 166 for purposes later described.

Any negative output pulses appearing at terminal 104 are amplified and inverted by amplifier 120 to provide a positive pulse at output terminal 136 which is applied to the base T7B of transistor T7. Likewise, any negative pulses appearing at terminal 108 are amplified and inverted by amplifier 124 to provide positive pulses at output terminal 146 which are applied to the base T8B of transistor T8. The positive going leading edge of a positive pulse applied to base T7B in response to a negative pulse supplied to the input of amplifier 120, turns off transistor T7, and with the help of the feedback links causes transistor T8 to be turned on through customary flip-flop action, thereby transferring the flip-flop 122 from stable state B to stable state A. When the positive going leading edge of a positive pulse appears at output terminal 146 of amplifier 124 in response to a negative pulse supplied to the input of amplifier 124, transistor T8 is turned off and transistor T7 is turned on, thereby transferring the flip-flop 122 from stable state A to its other stable state B.

From the foregoing description it is seen that the generator 80 so drives the flip-flop 122 that the flip-flop alternates from one to the other of its stable states at the same frequency that the A.-C. on line 46 alternates from one to the other of its half-cycles.

When the flip-flop is triggered into the A state, transistor T8 is turned on, and a voltage is applied across the lower half 156 of the primary winding of transformer 152, thereby inducing a voltage across each of the secondary windings 160, 162, 164 and 166, until the transformer 152 core saturates, thereby ending the induced voltage. The full voltage is across the transformer until it saturates, at which time the voltage across the transformer drops to substantially zero while most of the voltage is dropped across resistor 134. This action produces a pulse in each secondary winding of the transformer 152 that starts when the flip-flop changes states from B to A, and ends when the transformer 152 saturates. The particular polarity of the pulses produced in the secondaries of transformer 152 in response to the flip-flop being triggered into the A state may arbitrarily be such that the lower terminals 160B, 162B, 164B and 166B of the secondaries are positive.

In like manner, when the flip-flop is triggered from state A to state B in response to a positive signal on the base T4B of transistor T4, transistor T7 is turned on to energize the primary half section 148 of transformer 152 to induce a pulse in the secondaries of the transformer of such polarity as to make the upper terminals 160A, 162A, 164A and 166A of the secondaries positive. Thus, it should now be apparent that in response to an A.-C. input signal of sufficient amplitude supplied to the input circuit 58, the output of circuit 14 at the secondaries of transformer 152 will deliver alternating pulses of opposite polarity, with the instantaneous polarity of the pulses being dependent upon and reversing with the instantaneous polarity of the input signal on lines 54 and 56, and the position in time of the pulses with respect to the input signal being dependent on the amplitude of the input waves. More specifically, each half cycle of the input signal to input circuit 58 causes the production of an output pulse whose instantaneous polarity is dependent on the instantaneous polarity of the half cycle, and whose position in time with respect to the half cycle is dependent upon the amplitude of the half cycle. Since the flip-flop switches from one stable state to the other in response to the leading edges of the generator 80 output pulses (through amplifiers 120 and 124), the phase position of the output pulses from transformer 152 relative to the error input to generator 80 is dependent on the phase position of the leading edges of the generator 80 output pulses, which in turn depends on the amplitude of the input error signal to generator 80.

The current converter 16, by way of example, is shown as a rectifier. It is supplied with A.-C. from the center-tapped secondary winding 170 of a transformer 172 having a primary winding connected to the A.-C. line 46. The secondary winding of transformer 172 is provided with a center tap 176 and end terminals 178 and 180. The D.-C. load on rectifier 16 is the thermoelectric element 18.

Interposed between the A.-C. output $V_R$ of transformer 170 and the load 18 are a plurality of unidirectional controllable switching elements whose conduction times are selectively controlled by the output of transformer 152. The unidirectional switch elements may for example be controlled rectifiers such as gas thyratrons, solid state rectifiers, or other suitable types. Controlled solid state rectifiers are shown by way of example at 182, 184, 186 and 188. Each has an anode, a cathode and a gate. For example, the anode, cathode, and gate of rectifier 188 are respectively indicated at 190, 192 and 194. Rectifiers 182 and 184 are oppositely poled and connected in parallel between transformer terminal 178 and a load circuit terminal 196. The other load circuit terminal is constituted by the center tap 176. Rectifiers 186 and 188 are also oppositely related and are connected in parallel between transformer terminal 180 and the load terminal 196. Included in the load circuit between the terminal 196 and the center tap 176 are the thermoelectric element 18 and a filtering inductance 198.

The structure of the type of rectifier symbolized at 182, 184, 186 and 188 is of the type sometimes referred to as solid state thyratron and is shown in FIG. 3. In order to fire this type of device, that is, make it switch to the high conduction state, the anode must be positively biased with respect to the cathode, and a positive voltage must be applied from gate to cathode to make the gate positive with respect to the cathode. Once the device is in a high conduction state, it continues conduction indefinitely after removal of the gate signal until the anode current is interrupted, for example by reversal of the A.-C. supply voltage.

Secondary winding 160 is connected across the gate-cathode circuit of rectifier 182 with terminal 160B connected to the gate through a current limiting resistor 200. Secondary 162 is connected across the gate-cathode circuit of rectifier 184 with terminal 162B connected through a current limiting resistor 202 to the gate of rectifier 184. Secondary 164 is connected across the gate-cathode circuit of rectifier 186 with terminal 164A connected through a current limiting resistor 204 to the gate of the rectifier. Secondary 166 is connected across the gate-cathode circuit of rectifier 188 with terminal 166A conected through a current limiting resistor 206 to the gate of the rectifier. The arrangement is such that when the supply A.-C. $V_R$ from transformer 170 is positive at terminal 178, either rectifier 184 or rectifier 188 will fire depending on which one receives a positive gating pulse. Likewise, when the A.-C. supply voltage is positive at terminal 180, either rectifier 182 or 186 can be fired depending on which one receives the positive gating pulse.

Thus, when the supply terminal 178 is positive, if flip-flop 122 is switched to the A state, in response to positive input signal applied to generator channel 80A, secondary 162 will apply a positive gating pulse to rectifier 184, thereby firing rectifier 184 at a conduction angle which is dependent on the amplitude of the input wave to channel 80A. As a result current will flow through the thermoelectric load 18 in the direction of arrow 210. However, if, when termianl 178 is positive, the flip-flop is switched into the B state in response to a positive input signal to channel 80B, a positive gating pulse is applied by secondary 166 to rectifier 188 to fire this rectifier and provide load current in the direction of arrow 212, i.e., the opposite direction through load 18.

When terminal 180 is positive, and the flip-flop is switched to the A state in response to positive signal at the input to channel 80A, a positive gating signal is applied to rectifier 182 by secondary 160 to provide current through the load 18 in the direction of arrow 212. On the other hand, if when terminal 180 is positive, the flip-flop is switched to the B state in response to positive command signal at channel 80B, a positive gating pulse from secondary 164 is applied to rectifier 186, thus providing current through load 18 in the direction of arrow 210.

The operation of the system will now be discussed. Let it be assumed that current in the direction of arrow 210 causes the thermoelectric heat pump couple 18 to add heat to zone 22 thereby causing the temperature of the zone to increase, and that current in the direction of arrow 212 causes the thermoelectric element 18 to remove heat from zone 22 thereby to cause a temperature drop in the zone. Let it be further assumed that the circuit arrangement is such that when terminal 28 is positive, terminal 178 will be positive, and that a drop in temperature below normal in zone 22 will result in an error signal on lines 54 and 56 that is in phase with the A.-C. at terminals 28 and 178, and is applied as positive signal to the input of generator channel 80A and simultaneously therewith as a negative signal to the input of generator channel 80B, with all of these polarities reversing when the A.-C. of line 46 reverses. With the same arrangement, when terminals 28 and 178 are positive, an increase in temperature above normal in zone 22 will result in an error signal in lines 54 and 56 that is 180° out of phase with the input A.-C. at terminals 28 and 78, and applied as a positive signal to the input of generator channel 80B and as a negative signal to the input of channel 80A with all these polarities reversing when the line 46 reverses.

The system reaction when a fall in temperature below normal in zone 22 is sensed by the thermistor 20 is graphically illustrated in FIG. 4, wherein the waveforms at $(a)$, $(b)$, $(c)$, $(d)$, $(e)$, $(f)$ and $(g)$ are on the same time base. The input A.-C. to the bridge 26 is shown at $V_{IN}$ in FIG. 4($a$), and the A.-C. at the secondary of transformer 170 is shown at $V_R$ in FIG. 4($g$). For the previously assumed arrangement, the error signal produced on lines 54 and 56, when the temperature drops below normal, is in phase with the input A.-C. $V_{IN}$. The error signal for this condition is shown at $V_E$ in FIG. 4($b$) wherein the dashed lines indicate the threshold level of the pulse generator 80. The amplitude of the error signal depends on and varies with the degree of temperature deviation. The error signal in FIG. 4($b$), during the first period is seen as a positive signal at the input of generator channel 80A and as a negative signal at the input of generator channel 80B. Being at saturation, transistor T4 is unaffected by the negative signal. However, the positive signal on base T3B results in a negative pulse at 104 shown at FIG. 4($c$), whose leading edges lag the leading edges of the error signal by an angle $\theta$, which depends on and varies with the amplitude of the error signal. This pulse produces positive pulses at the "B" terminals of the secondaries of transformer 152 to apply positive gating pulses to rectifiers 182 and 184 as shown in FIG. 4($e$) (first period). Ineffective negative pulses applied during this period to rectifiers 186 and 188 are shown in FIG. 4($f$). Since terminal 178 is positive during this period, the positive gating pulse of FIG. 4($e$) is effective only on rectifier 184 to produce voltage $V_O$ poled to cause current flow through load 18 in the "heating" direction 210 (FIG. 4($g$)).

On the next half cycle (second period), voltages $V_{IN}$, $V_E$ and $V_R$ reverse, and positive signal is applied to generator channel 80B, resulting in a negative pulse at terminal 108 (FIG. 4($d$)) and positive gating pulses on rectifiers 186 and 188 (FIG. 4($f$)). Terminal 180 being positive, only rectifier 186 is fired, producing voltage $V_O$ poled to produce current flow through load 18 in the "heating" direction 210 (FIG. 4($g$)). As the temperature increases, the error $V_E$ will be reduced, and the rectifier out voltage $V_O$ will decrease. When the error $V_E$ falls below the generator 80 threshold, the firing pulses will be removed and the output $V_O$ and resultant current will be zero. At this time, the temperature is within a small "normal" band where no corrective action is needed. The firing angle $\theta$ of the rectifiers and therefore the magnitude of resulting current is dependent upon and determined by the magnitude of the error signal $V_E$, which in turn depends on amount of temperature deviation.

If the temperature in zone 22 rises above normal (above the regulating band), the error signal $V_E$ is 180° out of phase with the A.-C. voltages $V_{IN}$ and $V_R$. This is illustrated in FIG. 5, wherein the input A.-C. voltages $V_{IN}$ and $V_R$ are shown at ($a$) and ($g$) respectively. The error voltage $V_E$ is shown in FIG. 5($b$) superposed on the threshold level (dash line) of pulse generator 80. As indicated in FIGS. 5($c$) and ($d$), the effects on generator channels 80A to 80B for a particular half cycle of the input A.-C. are the reverse of those in FIG. 4. Likewise, the pulses produced by secondary 152 (FIG. 5($e$), ($f$))

are reversed relative to those in FIG. 4(e), (f). Thus, for this condition gating pulses as shown in FIG. 5(e) are applied to rectifier 188 during the first period (terminal 178 positive), and to rectifier 182 (FIG. 5(f)) during the second period (terminal 180 positive). This produces output voltage V₀ poled to cause current flow in the "cooling" direction 212 to the thermoelectric couples 18, thereby returning the controlled temperature to the regulating band. The width of the band and the gain of the system may be adjusted by setting the input threshold level of the generator 80. In practice, the width of this band is less than ½° F. and could be made even smaller. The regulating band, whatever its width, is the "normal temperature."

The following examples of component types and values may be employed in the system of FIG. 1 to provide successful operation as described herein.

Battery 72—10 volts
Thermistor 20—NTC 200 ohms at 100° F.
Resistors 36 and 38—100 ohms each
Resistor 40—50 ohms
Adjustable resistors 42 and 90—2500 ohms
Resistors 64, 82 and 83—2000 ohms each
Resistors 65, 66, 67, 68, 84 and 88—10,000 ohms each
Adjustable resistors 69 and 86—5000 ohms each
Resistors 92, 94, 98, 100, 102, 106—5,100 ohms each
Resistors 132 and 140—240 ohms each
Resistors 135 and 144—1000 ohms each
Resistors 134 and 142—25 ohms each
Resistors 200, 202, 204 and 206—50 ohms each
Transistors T1, T2, T3, T4, T5 and T6—type 2N109
Transistors T7 and T8—type 2N1172
A.-C. source 48—115 v., 60 c.p.s.
Capacitor 75—.02 mfd.
Transformer 44 secondary—3 to 4 volts
Transformer 172 secondary—16 volts center-tapped
Reactor 198—5-4 mh.
Transformer 152—1:1 ratio
Controlled rectifiers 182, 184, 186 and 188—Westinghouse type WX809 (silicon)

It is to be understood that the herein described arrangements are simply illustrative of the principles of the invention, and that other embodiments and applications are within the spirit and scope of the invention.

We claim as our invention:

1. Control apparatus comprising a source of variable amplitude alternating waves, pulse former means responsive to half cycles of one polarity of said waves for producing first output pulses, said pulse former means being responsive to half cycles of the opposite polarity of said waves for producing second output pulses, the phase positions of the leading edges of said first and second output pulses relative to said waves being dependent on the amplitude of said waves, a flip-flop which switches into a first stable state in response to said first output pulses, and into a second stable state in response to said second output pulses, saturating magnetic means for producing control pulses of one polarity in response to one state of the flip-flop and of the opposite polarity in response to the other state of the flip-flop, and controlled rectifier means for converting A.-C. of the same frequency as that of said waves to D.-C., said rectifier means being responsive to said control pulses of one polarity for producing D.-C. in one direction for a given phase position of said A.-C., and in the opposite direction for the phase of said A.-C. opposite to said given phase, said rectifier means being responsive to said control pulses of the opposite polarity for producing D.-C. in said opposite direction for said given phase position of the A.-C. and in said one direction for said opposite phase of the A.-C.

2. Regulating apparatus comprising condition responsive means for producing periodic alternating waves whose amplitude varies with deviation of said condition from a desired norm and whose instantaneous polarity is dependent on the direction of said deviation, pulse former means responsive to half cycles of one polarity of said waves for producing first output pulses, said pulse former means being responsive to half cycles of the opposite polarity of said waves for producing second output pulses, the phase positions of the leading edges of said first and second output pulses relative to said waves being dependent on the amplitude of said waves, a flip-flop which switches into a first stable state in response to said first output pulses, and into a second stable state in response to said second output pulses, saturating magnetic means for producing control pulses of one polarity in response to one state of the flip-flop and of the opposite polarity in response to the other state of the flip-flop, controlled rectifier means for converting A.-C. of the same frequency as that of said waves to D.-C., said rectifier means being responsive to said control pulses of one polarity for producing D.-C. in one direction for a given phase position of said A.-C., and in the opposite direction for the phase of said A.-C., opposite to said given phase, said rectifier means being responsive to said control pulses of the opposite polarity for producing D.-C. in said opposite direction for said given phase position of the A.-C. and in said one direction for said opposite phase of the A.-C., and means responsive to said D.-C. for controlling said condition.

3. Temperature regulating apparatus comprising temperature responsive means for producing periodic alternating waves whose amplitude varies with deviation of said temperature from a desired norm and whose instantaneous polarity is dependent on the direction of said deviation, pulse former means responsive to half cycles of one polarity of said waves for producing first output pulses, said pulse former means being responsive to half cycles of the opposite polarity of said waves for producing second output pulses, the phase positions of the leading edges of said first and second output pulses relative to said waves being dependent on the amplitude of said waves, a flip-flop which switches into a first stable state in response to said first output pulses, and into a second stable state in response to said second output pulses, saturating magnetic means for producing control pulses of one polarity in response to one state of the flip-flop and of the opposite polarity in response to the other state of the flip-flop, controlled rectifier means for converting A.-C. of the same frequency as that of said waves to D.-C., said rectifier means being responsive to said control pulses of one polarity for producing D.-C. in one direction for a given phase position of said A.-C. and in the opposite direction for the phase of said A.-C. opposite to said given phase, said rectifier means being responsive to said control pulses of the opposite polarity for producing D.-C. in said opposite direction for said given phase position of the A.-C. and in said one direction for said opposite phase of the A.-C., and means responsive to said D.-C. for controlling said temperature.

4. Control apparatus comprising a source of variable amplitude alternating waves, pulse forming means which produce an output pulse only in response to input signals above a predetermined threshold level, said pulse forming means being responsive to half cycles of one polarity of said waves for producing first output pulses, said pulse forming means being responsive to half cycles of the opposite polarity of said waves for producing second output pulses, the phase positions of the leading edges of said first and second pulses relative to said waves being dependent on the amplitude of said waves, a flip-flop which switches into a first stable state in response to said first output pulses, and into a second stable state in response to said second output pulses, saturating magnetic means for producing control pulses of one polarity in response to one state of the flip-flop and of the opposite polarity in response to the other state of the flip-flop, and rectifier means for converting A.-C. of the same frequency as that of said waves to D.-C., said rectifier means comprising an A.-C. input circuit and a D.-C. output circuit, first controllable valve means interposed between the A.-C. input circuit and the D.-C. output circuit and responsive to said control pulses of one polarity for providing D.-C. in one direction for a given phase position of said A.-C. and in the opposite direction for the opposite phase position of said A.-C., second controllable valve means interposed between said A.-C. input circuit and the D.-C. output circuit and responsive to said control pulses of the opposite polarity for providing D.-C. in said opposite direction for said given phase position of the A.-C., and in said one direction for said opposite phase position of the D.-C.

5. Regulating apparatus comprising condition responsive means for producing periodic alternating waves whose amplitude varies with deviation of said condition from a desired norm and whose instantaneous polarity is dependent on the direction of said deviation, pulse forming means which produces an output pulse only in response to input signals above a predetermined threshold level, said pulse forming means being responsive to half cycles of one polarity of said waves for producing first output pulses, said pulse forming means being responsive to half cycles of the opposite polarity of said waves for producing second output pulses, the phase positions of the leading edges of said first and second pulses relative to said waves being dependent on the amplitude of said waves, a flip-flop which switches into a first stable state in response to said first output pulses, and into a second stable state in response to said second output pulses, saturating magnetic means for producing control pulses of one polarity in response to one state of the flip-flop and of the opposite polarity in response to the other state of the flip-flop, rectifier means for converting A.-C. of the same frequency as that of said waves to D.-C., said rectifier means comprising an A.-C. input circuit and a D.-C. output circuit, first controllable valve means interposed between the A.-C. input circuit and the D.-C. output circuit and responsive to said first output pulses for providing D.-C. in one direction for a given phase position of said A.-C. and in the opposite direction for the opposite phase position of said A.-C., second controllable valve means interposed between said A.-C. input circuit and the D.-C. output circuit and responsive to said second output pulses for providing D.-C. in said opposite direction for said given phase position of the A.-C., and in said one direction for said opposite phase position of the D.-C., and means responsive to said D.-C. for affecting said condition.

6. Temperature regulating apparatus comprising temperature responsive means for producing periodic alternating waves whose amplitude varies with deviation of said temperature from a desired norm and whose instantaneous polarity is dependent on the direction of said deviation, pulse forming means which produces an output pulse only in response to input signals above a predetermined threshold level, said pulse forming means being responsive to half cycles of one polarity of said waves for producing first output pulses, said pulse forming means being responsive to half cycles of the opposite polarity of said waves for producing second output pulses, the phase positions of the leading edges of said first and second pulses relative to said waves being dependent on the amplitude of said waves, a flip-flop which switches into a first stable state in response to said first output pulses, and into a second stable state in response to said second output pulses, saturating magnetic means for producing control pulses of one polarity in response to one state of the flip-flop and of the opposite polarity in response to the other state of the flip-flop, rectifier means for converting A.-C. of the same frequency as that of said waves to D.-C., said rectifier means comprising an A.-C. input circuit and a D.-C. output circuit, first controllable valve means interposed between the A.-C. input circuit and the D.-C. output circuit and responsive to said control pulses of one polarity for providing D.-C. in one direction for a given phase position of said A.-C. and in the opposite direction for the opposite phase position of said A.-C., second controllable valve means interposed between said A.-C. input circuit and the D.-C. output circuit and responsive to said control pulses of opposite polarity for providing D.-C. in said opposite direction for said given phase position of the A.-C. and in said one direction for said opposite phase position of the D.-C., and means responsive to said D.-C. for affecting said temperature.

7. Control apparatus comprising a source of alternating waves having variable amplitude, pulse former means responsive to half cycles of one polarity of said waves for producing first output pulses, said pulse former means being responsive to half cycles of the opposite polarity of said waves for producing second output pulses, the phase positions of the leading edges of said first and second output pulses relative to said waves being dependent on the amplitude of said waves, first and second pulse forming channels having respective inputs arranged to receive said input waves in push-pull whereby a given polarity of the input wave affects said channels in opposite manner, said channels being responsive only to portions of said waves above a predetermined threshold value, said first channel being responsive to half cycles of one polarity of said waves to produce first output pulses, said second channel being responsive to half cycles of the opposite polarity of said waves for producing second output pulses, the leading edges of said first and second output pulses relative to said waves being dependent on the amplitude of said waves, rectifier means for converting A.-C. of the same frequency as that of said waves to D.-C., said rectifier means comprising an A.-C. input circuit and a D.-C. output circuit, first controllable valve means interposed between the A.-C. input circuit and the D.-C. output circuit and responsive to said first output pulses for providing D.-C. in one direction for a given phase position of said A.-C. and in the opposite direction for the opposite phase position of said A.-C., second controllable valve means interposed between said A.-C. input circuit and the D.-C. output circuit and responsive to said second output pulses for providing D.-C. in said opposite direction for said given phase position of the A.-C., and in said one direction for said opposite phase position of the D.-C., and circuit means responsive to said D.-C.

8. In electrical apparatus, a flip-flop having two stable states, means for causing said flip-flop to alternate from one to the other of its stable states at a predetermined frequency, saturating magnetic means for producing control pulses of one polarity in response to one state of the flip-flop and of the opposite polarity in response to the other state of the flip-flop, controlled rectifier means for converting A.-C. of particular periodicity to D.-C., said periodicity being such that said A.-C. alternates from one to the other of its half-cycles at said predetermined frequency, said rectifier means being responsive to said control pulses of one polarity for producing D.-C. in one direction for a given phase position of said A.-C., and in the opposite direction for the phase of said A.-C. opposite to said given phase, said rectifier means being responsive to said control pulses of the opposite polarity for producing D.-C. in said opposite direction for said given phase position of the A.-C. and in said one direction for said opposite phase of the A.-C.

9. In an electrical control system, a source of variable amplitude periodic alternating waves, a two channel pulse generator responsive to only portions of said waves above a predetermined threshold value for producing output pulses at one or the other of said channels depending on the instantaneous polarity of said waves, the phase position of the leading edges of said pulses relative to said waves being dependent on the amplitude of said waves, means responsive to said output pulses from said one channel for producing control pulses of one polarity, means responsive to said output pulses from said other channel for producing control pulses of the opposite polarity, controlled rectifier means for converting A.-C. of the same frequency as that of said waves to D.-C., said rectifier means being responsive to said control pulses of one polarity for producing D.-C. in one direction for a given phase position of said A.-C., and in the opposite direction for the phase of said A.-C. opposite to said given phase, said rectifier means being responsive to said control pulses of the opposite polarity for producing D.-C. in said opposite direction for said given phase position of the A.-C. and in said one direction for said opposite phase of the A.-C.

References Cited in the file of this patent

UNITED STATES PATENTS

| | | |
|---|---|---|
| 2,908,829 | Schaeve | Oct. 13, 1959 |
| 2,918,619 | Darling | Dec. 22, 1959 |
| 2,964,655 | Mann | Dec. 13, 1960 |